June 20, 1961 H. SEIDEL ET AL 2,989,709

MAGNETICALLY CONTROLLED WAVE GUIDE SWITCH

Filed Sept. 16, 1955 3 Sheets-Sheet 1

INVENTORS H. SEIDEL
J. A. WEISS
BY
Franklin Mohr
ATTORNEY

MAGNETICALLY CONTROLLED WAVE GUIDE SWITCH

Filed Sept. 16, 1955 3 Sheets-Sheet 2

INVENTORS H. SEIDEL
J. A. WEISS
BY
Franklin Mohr
ATTORNEY

MAGNETICALLY CONTROLLED WAVE GUIDE SWITCH

Filed Sept. 16, 1955 3 Sheets-Sheet 3

INVENTORS H. SEIDEL
J. A. WEISS

BY

Franklin Mohr

ATTORNEY

United States Patent Office 2,989,709
Patented June 20, 1961

2,989,709
MAGNETICALLY CONTROLLED WAVE GUIDE SWITCH

Harold Seidel, Plainfield, and Jerald A. Weiss, Summit, N.J., assignors to Bell Telephone Laboratories, Incorporated, New York, N.Y., a corporation of New York Filed Sept. 16, 1955, Ser. No. 534,703
4 Claims. (Cl. 333—98)

This invention relates to switching devices for use with electromagnetic waves propagating in wave guides and more particularly to magnetically controlled wave guide switches.

A wave guide switch will be said to be closed, or to be in the closed condition, if wave propagation through the wave guide is substantially free and unobstructed. The switch will be said to be open, or to be in the open condition, if wave propagation is obstructed, attenuated, or substantially stopped. This terminology parallels the case of a mechanical switch, e.g. a single-pole, single-throw knife switch, which when closed allows current to flow through it and when open stops the flow of current.

A magnetically controlled switch will be said to be in the normal state if no externally applied magnetizing field is being maintained to establish which of the two states the switch is in. A switch may be normally closed, in which case the switch is in the closed condition when no magnetizing field is applied. On the other hand, a switch may be normally open, in which case the switch is in the open condition when no magnetizing field is applied. In these cases the application of a suitable magnetizing field opens the normally closed switch or closes the normally open switch as the case may be. More generally, it may be that neither the closed state nor the open state is obtained without the application of the external magnetizing field but one value of externally applied magnetizing field will place the switch in the open condition and another value will place it in the closed condition. If one of these values is zero, then a normal state exists as hereinabove defined.

An object of the invention is to minimize attenuation of the electromagnetic wave in passing through a magnetically controlled wave guide switch in the closed condition.

Another object is to increase the attenuation which the switch introduces when in the open condition where complete stoppage of propagation is not attainable. Due to conservation of energy, that part of the wave energy in a wave guide which is not propagated is absorbed, reflected, diverted, or otherwise accounted for. The part of the energy that is propagated may be measured in terms of attenuation and expressed in decibels.

A further object of the invention is to provide suitable conditions at both the input side and the output side of the switch so that on either side either total absorption, total diversion, or total reflection of the wave energy may be approximated, according to the result that is desired.

A feature of the invention is the use in the wave guide of an element, such as a slab of ferrite, of magnetically polarizable material which exhibits the gyromagnetic effect at the operating frequencies to effect a control over the effective width and in turn the cut-off frequency of the wave guide. Hereinafter and for the sake of brevity materials of the character just referred to will be identified simply as gyromagnetic materials.

Another feature is a physical restriction of the width of the part of the wave guide in which the gyromagnetic element is located whereby the latter element controls the effective width of the restricted portion of the wave guide.

In a preferred embodiment of the invention, a wave guide is divided into two portions by a conductive longitudinal septum, each portion when empty being beyond cut-off, i.e. of insufficient width to propagate wave energy at the operating frequency. In each portion is placed a ferrite slab and in one portion a wave energy absorbent element of lossy material.

Externally applied magnetizing fields are used and are so proportioned that in one state, the closed condition, the wave entering the switch from the input side is excluded from the portion of the divided wave guide containing the lossy material and is passed through the other side with little or no attenuation.

In the second state, the open condition, a wave entering the switch from the input side is passed into the portion of the divided wave guide containing the lossy material and is substantially absorbed thereby. The other portion of the divided wave guide is beyond cut-off and so does not pass any material part of the wave energy. At the output side, a high degree of substantially loss-less reflection occurs if a wave returns toward the input side.

A continuous gradation of intermediate states may be obtained by varying the magnetizing field between the open and closed conditions. A continuous variation of power output results thereby which may be utilized to effect amplitude modulation in well known manner.

Alternatively, the two portions of the divided wave guide may be connected to individual output paths and the absorbent body of lossy material omitted, in which case the wave energy may be switched from one output path to the other, thereby utilizing the energy in one path or the other instead of wasting any energy in the lossy material.

The number of alternate paths into which the wave energy may be switched need not be limited to two. If desired, the wave guide may be divided into three or more portions by means of two or more conductive septa. Each portion may be provided with a ferrite slab, magnetically controlled independently of the other ferrite slabs. Each portion may be provided with an individual output path wherein the energy may be diverted to any desired one or more of the output paths as desired.

Figures 1, 2:
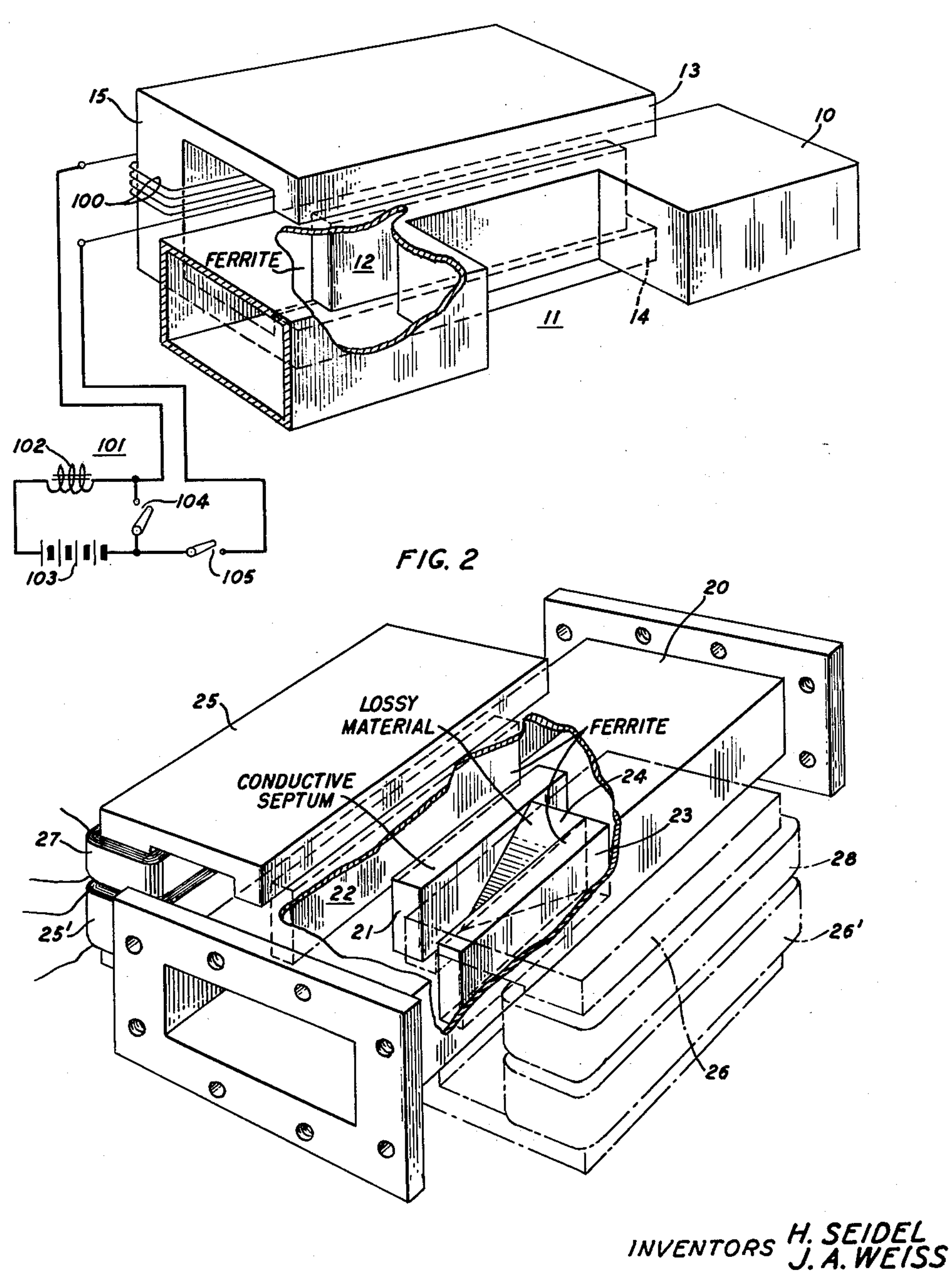
FIG. 1 is a perspective view partly broken away showing a notched form of wave guide switch embodying the invention.
FIG. 2 is a perspective view partly broken away showing a form of wave guide switch in which the wave guide is full width throughout except that the interior is divided by a conductive septum.

In FIG. 1 is shown a conductively bounded wave guide 10 of rectangular cross section having a notched or recessed portion 11 wherein the width of the wave guide is restricted, e.g. to about one-third the width in the unnotched portion. A single notch is shown on one side of the wave guide, although, if desired, the wave guide can have notches in both sides. A slab 12 of ferrite partially fills the cross section in the narrow portion of the wave guide, the slab being shown in contact with the common side wall although the slab may be spaced from the wall if desired. The slab 12 is preferably longer than the notched portion of wave guide. Except for the presence of the ferrite slab, the notched portion of the wave guide is beyond cut-off at the operating frequency. By selecting a suitable thickness of ferrite slab and using a ferrite of such composition as to have a fairly high dielectric constant, the narrow wave guide may be dielectrically loaded sufficiently to place the narrow section above cut-off, i.e. effectively wide enough for wave propagation at the operating frequency, in the absence of any externally applied magnetizing field in the ferrite. Thus, the structure becomes a normally closed switch for electromagnetic waves of the operating frequency.

The notched portion of the wave guide is placed between the pole pieces 13, 14 of an electromagnet 15 having a winding 100 so that a transverse magnetic field can be applied to the ferrite slab, in the vertical direction in the drawing, as by use of a battery 103 and a switch 105, either directly connected to the winding 100 or through an energizing circuit 101.

By selecting a suitable value of the externally applied magnetizing field intensity the effective value of the permeability of the ferrite can be reduced to zero. For a discussion of the concept of permeability in gyromagnetic materials, reference may be made to an article by D. Polder, entitled "On the Theory of Electromagnetic Resonance," in Philosophical Magazine, 1949, Volume 40, pages 99–115. In the state of zero effective permeability the ferrite becomes incapable of supporting or progagating the electromagnetic waves, which latter are then confined to the narrow unfilled portion of the recessed wave guide. Since this portion of the wave guide is beyond cut-off, there is substantially no wave transmission and the switch is then in the open condition. Since marked discontinuity exists at each end of the notched portion of the wave guide, waves approaching from either direction are mainly reflected. If it is desired to provide an impedance match for waves approaching the switch from the input side when the switch is open, auxiliary means must be provided. For this purpose a double form of switch as shown in FIG. 2 is suitable.

In an embodiment in accordance with FIG. 1 which was built and successfully operated, the full width wave guide was 1.590 by 0.795 inches in cross section. The width of the notch was chosen so that the width of the unfilled portion was one-half that required for propagation at the operating frequency. The notched portion was about one inch long. An insertion loss of about 50 decibels was obtained from the input side to the output side in the open state of the switch. It was found that the insertion loss increases approximately linearly with the length of the notch. Accordingly, the length of the notch can be adjusted to give any desired amount of insertion loss in the open state.

When the externally applied magnetizing field is removed the switch closes. The insertion loss in the closed state is determined essentially by the extent of the impedance mismatches at the terminals of the notch and by the dielectric and magnetic losses in the ferrite slab. The effect of the abrupt change in dimensions of the wave guide at the ends of the notch is effectively nullified by allowing the ferrite slab to extend a short distance into the full-size wave guide at both ends, as shown in FIG. 1. Apparently the wave energy is concentrated so strongly in the ferrite that the step in the wave guide wall is of little effect. There is, as expected, a dependence of the insertion loss on the phase relation between the waves reflected or scattered from the two ends of the notch, as determined by the length of the notch.

In addition to the dependence of the insertion loss upon the geometrical configuration, there is a considerable dependence of the behavior of the ferrite upon the residual unidirectional (D.C.) magnetic field $H_{DC}$ caused by remanent magnetization of the electromagnet. This effect can be accounted for in part by a magnetic loss, termed initial loss, in the ferrite associated with the existence of domain walls, sometimes called Bloch walls. This type of loss disappears on application of a small steady unidirectional magnetic field sufficient to produce magnetic saturation in the ferrite. The remainder of the dependence of mismatch upon DC magnetic field is thought to be due to changes in the four-pole impedances of the notched section caused by the variation with $H_{DC}$ of the effective permeability of the ferrite. The insertion loss in these cases may be reduced by tuning, as by means of a slide-screw tuner. In a typical example, without tuning the reflection at the input produced a return loss of about 14 decibels in the closed state. With tuning, the return loss could be made so large that reflection was negligible and an insertion loss as low as one decibel was obtained.

The reluctance of the magnetic path containing the ferrite may be significantly reduced by reducing the air gap between the magnetic pole structure and the ferrite. In addition, appropriate composition of ferrite may be employed to reduce the excitation requirements. The value of $H_{DC}$ required to open a switch of the type shown in FIG. 1 in a typical case is about 30 oersteds.

The switch disclosed in FIG. 1 may also be operated as a normally open switch. There exists a range of values of $H_{DC}$ for which the effective permeability takes on very large values. These values obtain when the coefficients $\mu$ and K of the tensor permeability given by Polder are in the range where $\mu$ is very small, approaching zero and K is many times greater than $\mu$. The thickness of the ferrite slab for normally open operation is chosen so small that the dielectric loading which it supplies is insufficient to place the notch above cut-off and the switch accordingly is open. To close the switch, the field $H_{DC}$ of proper magnitude is applied, making the ferrite highly permeable so that wave propagation through the notch becomes possible. The value of $H_{DC}$ required to produce this closed condition is rather higher than that needed to open the normally closed type of switch. In one typical embodiment a value of $H_{DC}$ of 2500 oersteds gave best results in closing the normally open switch. Here, as before, the magnetic loss in the ferrite limits the performance of the switch in both the open and closed states.

When very rapid switching is required, the electromagnet 15 should be so designed as to have low inductance, and addy currents should be suppressed as by laminating the iron employed or by using nonconductive magnetic material such as ferrite. Alternatively, resistance may be added in series with the winding 100 to reduce the switching time, which, as is well known, is proportional to the ratio of inductance to series resistance, or other known expedients may be used.

Another way of increasing the switching speed is to employ the energizing circuit 101 shown in FIG. 1.

The energizing circuit 101 is adapted for rapid changeover of the magnetizing system between the two conditions required for operation of the wave guide switch. A ballast winding 102 on a separate magnetic core is provided, preferably having magnetic properties similar to those of winding 100 and its magnetic core. The battery 103 or other source of direct current is provided and may be connected to or disconnected from the winding 102 by means of a switch 104, e.g. a single-pole, single-throw knife switch. The battery 103 may be connected through winding 100 in series with winding 102, or disconnected therefrom, by means of the switch 105 in conjunction with the switch 104.

In the normal condition of the system of FIG. 1, switches 104 and 105 are both closed, so that winding 102 is energized but winding 100 is short circuited. To go rapidly to the condition in which winding 100 is energized, switch 104 is opened. The circuit 101 is thereby forced to go over to a new equilibrium state in which both the ballast winding 102 and the magnetizing winding 100 are energized with current equal to about half the current which originally flowed in switch 104. Analysis of this transient condition reveals that the shortness of the time required to set up the final current in winding 100 is limited only by the resistance of the opening switch 104. In return for obtaining very rapid switching it is necessary to deal with the extremely high voltage which is induced across the switch 104 by the rapid redistribution of magnetic field in the two windings. Measures known in the art should be taken to reduce the tendency to arcing across the gap in switch 104 to prevent damage to the switch and also because an arc provides a low resistance path which slows the switching process. To return the system to the normal state, switch 105 is opened and then to reset the system switches 104 and 105 are closed in that order. The speed with which the resetting can be accomplished is limited electrically by the inductive rise time of the ballast winding 102 alone.

Figure 3:
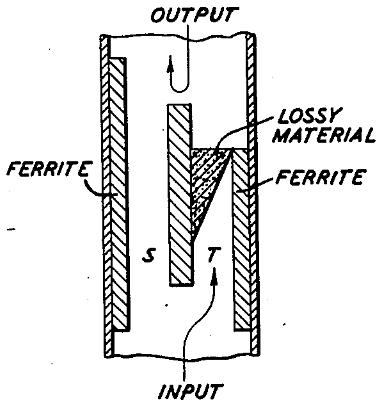
FIG. 3 is a plan view of the device of FIG. 2 with a diagrammatic showing of wave propagation paths for the open condition of the switch.

FIG. 2 shows a switch which is the equivalent of two notched wave guide switches with the additional provision of a matched termination at the input side which is effective when the switch is in the open state to avoid reflection of the wave energy from the switch back toward the wave source. The wave guide 20 is of rectangular cross section and is divided into two parallel portions by a conductive septum 21 which may be of brass. On one side of the septum (the left-hand side as viewed in FIG. 2) there is inserted a ferrite slab 22, shown mounted against the wave guide wall. The slab 22 is longer than the septum 21 and extends beyond the septum at both ends of the septum. On the other side of the septum (the right-hand side as viewed in the figure) is inserted another ferrite slab 23 which extends into the undivided wave guide at the input end (toward the viewer in the figure). The slab 23 at the output end (away from the viewer) extends to a lesser extent than the septum 21. A tapered element 24 of lossy material such as carbonized phenol plastic is placed within the axial length of the septum 21 with the pointed portion of element 24 directed toward the input end of the wave guide. The element 24 is designed to serve as a well-matched load for waves entering the portion of the wave guide to the right of the septum 21 as shown in FIGS. 2 and 3. The slab 23 and the element 24 are so placed that there exists a sufficient length of beyond cut-off wave guide between the output end of the septum 21 and the output ends of the slab 23 and element 24. Wave energy approaching from the output end of the structure is substantially totally reflected and substantially none reaches the slab 23 or the element 24 to be dissipated therein. The provision of this length of beyond cut-off wave guide is electrically equivalent to a conductive plate extending transversely from the output end of the septum 21 to the right-hand side wall of the wave quide and in many cases is preferable thereto from a mechanical standpoint.

Figure 4:
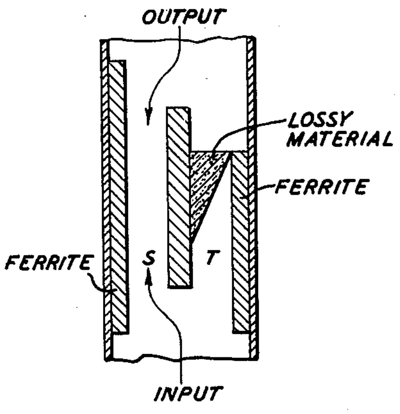
FIG. 4 is a plan view of the device of FIG. 2 with a diagrammatic showing of wave propagation paths for the closed condition of the switch.

In the operation of the composite switch of FIG. 2 each ferrite slab may be provided with its own source of $H_{DC}$. The closed state of the switch is that in which the passage to the left of the septum 21, designated the switching path, is closed and the passage to the right of the septum, designated the terminating path, is open, as shown diagrammatically in FIG. 4. With suitable tuning at the two ends the composite switch performs in the closed state substantially like the simple switch of FIG. 1. The discontinuities presented by the ends of the terminating path are, like the steps in the wave guide wall in FIG. 1, purely reactive.

In the open state of the composite switch the switching path is open and the terminating path is closed. At the input end the wave energy is diverted into the terminating path and there absorbed in the element 24. As seen from the output end, in this state both transmission paths are beyond cut-off and the device presents a reflection coefficient of essentially unit magnitude, i.e. reflection is nearly total. The open state is illustrated diagrammatically in FIG. 3.

The electromagnets 25 and 26 with main windings 25' and 26', respectively are provided to give the proper field intensities for one state (either open or closed). That state then plays the role of the normal state, and auxiliary windings 27 and 28 may be mounted on the respective magnets to bring about the other state.

Permanent magnets may also be employed, where, for example, a standby source of electromagnetic waves will occasionally be substituted for a source which becomes temporarily disabled. In that situation the switch will remain in one state, the standby state, most of the time. Hence, it will be advantageous to provide one or more permanent magnets to maintain the switch in the standby state to save current drain. Such a permanent magnet may be operated in either of two methods.

In the first method, the two operating states of the magnet, corresponding to the open and closed states of the switch, are the two states of remanent magnetism on a suitably located minor hysteresis loop of the magnet.

Figure 5:
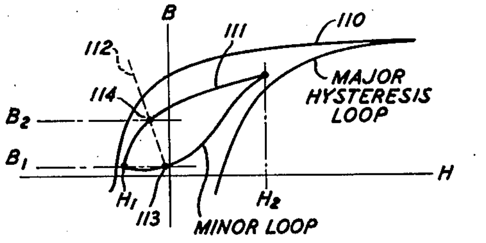
FIGS. 5 and 6 are diagrams useful in explaining the use of a permanent magnet to control a wave guide switch.

FIG. 5 shows a portion 110 of the major hysteresis loop of the material used for the permanent magnet yoke, and a minor loop 111 which the material traverses when the field in the yoke is made to take on alternate values $H_1$ and $H_2$ of magnetizing field. As is customary in showing hysteresis loops, the abscissae are values of magnetizing field, H, and the ordinates are values of magnetic induction, B. The dotted line 112, by its slope takes into account the demagnetizing effect due to the presence of magnetic poles on the surfaces of the yoke on both sides of the air gap. In the present instance the air gap contains some of the ferrite material. In the absence of an air gap, the remanent magnetism would be given by the intersection of the B-axis with the hysteresis loop in question. With the air gap, the remanent magnetism is given by the intersection of the line 112 with the hysteresis loop.

In accordance with the first method, the permanent magnet is operated over the minor loop 111. The intersections 113 and 114 of the minor loop with the line 112 are the operating points. The point 113 is arrived at by applying a brief negative pulse to a magnetizing winding on the yoke of the permanent magnet, the magnitude of the pulse being such as will produce the magnetizing force $H_1$. When the pulse has subsided, the remanent magnetic field has the value $B_1$ as indicated at the lower intersection of the minor loop with the line 112. The point 114 is arrived at by applying a brief positive pulse which will produce the magnetizing force $H_2$ after which the remanent magnetic field has the value $B_2$ as indicated at the upper intersection of the minor loop with the line 112. The values of magnetic induction $B_1$ and $B_2$ are proportional to the values of magnetic field existing in the gap in the respective cases.

In the second method of operating with a permanent magnet, one of the operating states, preferably the standby state, is a suitable state of remanent magnetization of the magnet while the other state is produced by applying and maintaining a steady current in the magnetizing winding. In this mode of operation the material again traverses a minor hysteresis loop, but in this case the ends of the loop are the operating points.

Figure 6:
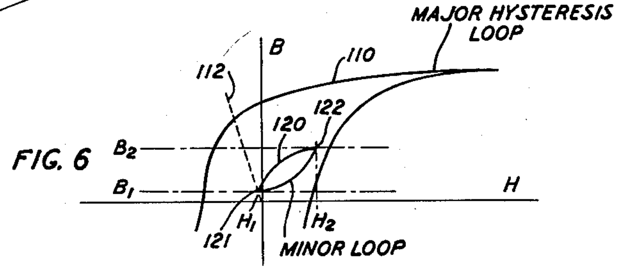

FIG. 6 shows the major hysteresis loop 110 as in FIG. 5, but with a different minor loop 120, typical of the second method of operation. $B_1$ and $B_2$ are again the respective operating fields in the gap. $H_1$ and $H_2$ are the corresponding magnetizing forces. The magnetizing force $H_2$ exists when magnetizing winding is energized and produces the operating field $B_2$. When the magnetizing winding is de-energized, the magnet retains the field $B_1$ as determined by the intersection of the loop 120 and the line 112.

In general, the designer of a switch of this type has at his disposal the use of ferrites of different composition in the various slabs, in particular, ferrites which differ in the value of saturation magnetization for each. Such a selection of materials results in a difference in the values of $H_{DC}$ at which the transformation from the open to the closed state and vice versa takes place in any given transmission path.

In a switch which was built along the lines of the switch of FIG. 2 and successfully operated, the following dimensions were used:

| | Length, inches | Width, inches |
|---|---|---|
| Septum 21 | 4 | 0.250 |
| Ferrite slab 22 | 5 | 0.180 |
| Ferrite slab 23 | 3 | 0.180 |
| Absorber 24 | 1½ | (tapered) |

The wave guide cross section was 1.590 by 0.795 inches. The septum 21 was centrally placed leaving transmission paths of width 0.670 inch on each side.

With a small amount of tuning at the input end, an insertion loss of 0.6 decibel and an input VSWR of 1.06 were measured in the closed state. An insertion loss of more than 60 decibels and an input VSWR of 1.02 were measured in the open state. The two values of $H_{DC}$ required were of the order of 500 oersteds each. Suitable design refinements such as were described hereinbefore in connection with the switch of FIG. 1 can be used to reduce the values of fields required to the order of 30 oersteds each. The ferrite slabs used had saturation magnetization values of 1600 gauss and 1000 gauss for slabs 22 and 23, respectively.

Figure 7:
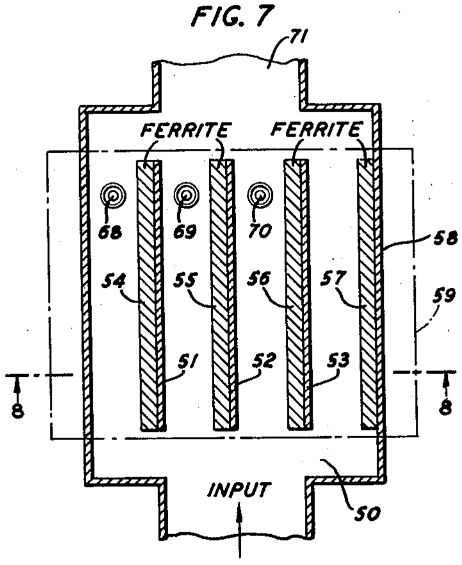
FIG. 7 is a plan view of a divided wave guide for extending the switching arrangement to serve a plurality of load circuits.
Figure 8:
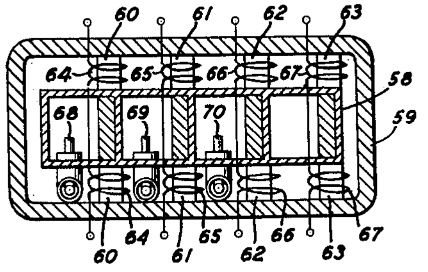
FIG. 8 is a cross-sectional view of the device of FIG. 7 from the viewpoint indicated by the line 8—8 in FIG. 7, with additional details shown.

In the arrangement of FIG. 7, a wave guide 50 has a widened portion which is divided by conductive septa 51, 52, 53, into four channels each of which is too narrow to support wave propagation at the operating frequency except for the use of special added devices. More or less than four channels may be used as desired, four being shown for the purpose of illustrating the principles involved. Ferrite slabs 54, 55, 56, 57, are provided individual to the four channels and are shown mounted next to septa 51, 52, 53 and a wave guide wall 58, respectively. A magnetic yoke 59 is common to all the ferrite slabs and has pole pieces 60, 61, 62, 63 individual to the respective slabs, as shown in FIG. 8. Each pole piece is provided with a winding 64, 65, 66, 67. Individual output means shown as probes 68, 69, 70 are provided in three of the respective channels, which probes are preferably the inner conductors of coaxial lines for connection to individual load circuits. The fourth channel may, if desired, be connected to an output wave guide 71.

In the operation of the arrangement of FIG. 7, the windings 64, 65, 66, 67, may be provided with magnetizing currents of suitable values to close the transmission path from the wave guide 50 to one or more of the individual load circuits in any desired manner. The paths may be opened or closed as desired by changing the respective magnetizing currents as required. The device may be used as a multiple path switching arrangement, or as a potentiometer for dividing the load in any desired proportion between two or more load circuits, or for other purposes.

Figure 9:
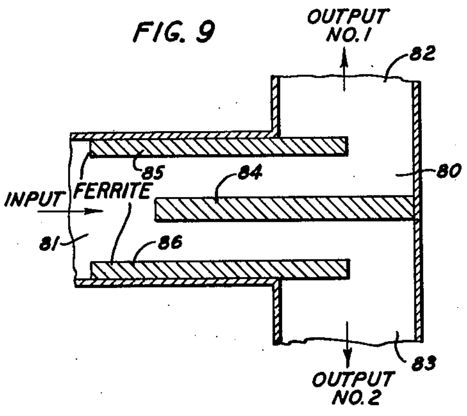
FIG. 9 is a plan view of a T-joint switch for use with two load circuits.

FIG. 9 shows a switching device similar to that shown in FIG. 2, except that by means of a T-joint structure two load connections are provided so that when wave propagation to one load circuit is not desired, the wave energy may be diverted to the second load circuit instead of dissipating the energy in an absorber. The figure shows a wave guide T-joint 80 with an input branch 81 and output branches 82 and 83. The input branch is divided into two portions by a conductive septum 84 which also isolates the two output branches by extending to the wave guide wall common to the output branches. Ferrite slabs 85, 86 are provided which are individual to the two paths and which may be individually controlled by magnets and magnetizing windings, a showing of which latter elements is omitted for the sake of clarity in the drawing.

The operation of the arrangement of FIG. 9 is similar to that of the arrangement of FIG. 7. The device of FIG. 9 may serve either as a switch or as a potentiometer.

Figure 10:
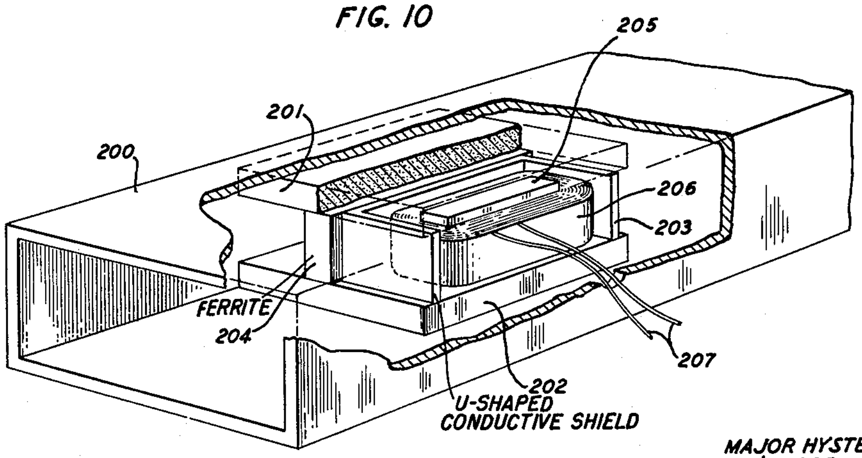
FIGS. 10 and 11 are perspective views partly broken away showing additional forms of wave guide switches operable in restricted portions of a wave guide.

In the arrangement of FIG. 10, a conductively bounded wave guide 200 of rectangular cross section has a restricted portion bounded by upper and lower ferrite slabs 201 and 202, respectively, and by a U-shaped conductive shield member 203 mounted between the slabs 201 and 202 as shown. A ferrite switching member 204 is also mounted between the slabs 201 and 202 for varying the effective width of the restricted wave guide portion. A magnetic circuit for controlling the effective permeability of the switching member 204 may be traced through slab 201, switching member 204, slab 202, and through a ferrite core member 205 back to slab 201. A magnetizing winding 206 with leads 207 is around the core member 205.

The operation of the arrangement of FIG. 10 is similar to that of the arrangement of FIG. 1.

The arrangements of FIGS. 1 and 10 differ structurally in certain respects. The wave guide 200 in FIG. 10 continues with unchanged dimensions in the region where the switching structure is provided. The shield member 203 provides the structural equivalent of the notch 11 of FIG. 1 and allows space within the wave guide 200 to be used to house the core member 205 and the winding 206. Thus, the entire magnetic circuit is included within the interior of the wave guide 200. The introduction of the ferrite slabs 201 and 202 causes a restriction in the effective height of the wave guide 200 in the restricted portion, which does not have any deleterious effect upon the operation of the device.

By suitable choice of ferrite composition for the switching element 204 and for the slabs 201, 202, and core element 205, the effect of changing the magnetizing current in the winding 206 may be confined substantially to the switching element 204 while the other ferrite members do not change their characteristic properties during operation of the switch or between such operations. The portions of the slabs 201 and 202 in the restricted portion of the wave guide serve as top and bottom conductive surfaces respectively for the restricted portion of the wave guide. The remaining portions of the slabs 201 and 202 serve as portions of the magnetic yoke for the winding 206.

Figure 11:
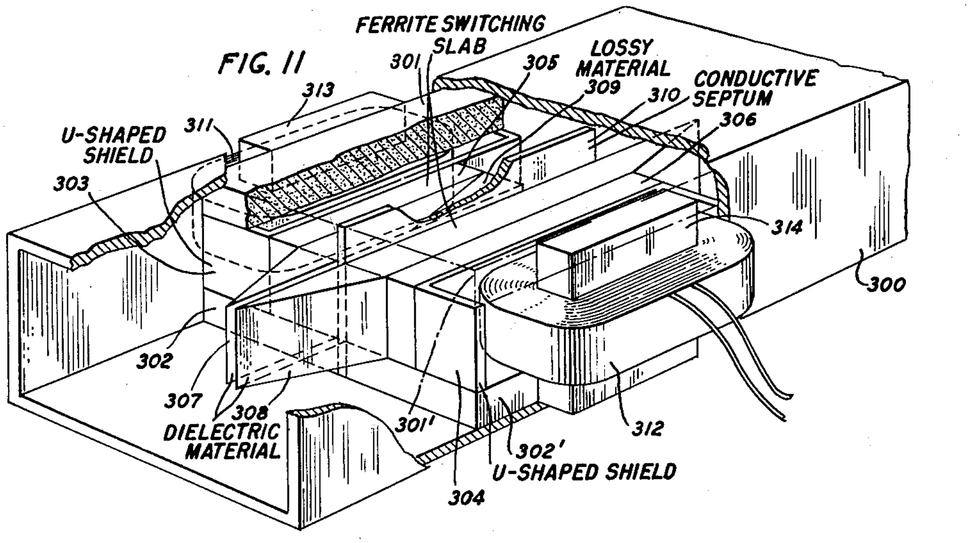

In the arrangement of FIG. 11, a conductively bounded wave guide 300 of rectangular cross section is divided into two parallel guides by a conductive septum 310 and is restricted in effective height in a limited region by upper ferrite slabs 301 and 301' and lower ferrite slabs 302 and 302'. The same limited region is restricted in effective width on each side of the septum 310 by U-shaped conductive shielding members 303 and 304, respectively. In the space bounded by the lower surface of slab 301, the upper surface of slab 302, the inner surface of the shielding member 303 and one side of the septum 310 there are closely fitting elements comprising a ferrite switching slab 305, a dielectric slab 307, and an energy absorbent terminating member 309 preferably composed of a synthetic tar-acid resin such as that which is sold commercially under the trademark Synthane. In the space bounded by the lower surface of slab 301', the upper surface of slab 302', the inner surface of the shielding member 304, and the other side of the septum 310 there are closely fitting elements comprising a ferrite switching slab 306 and a dielectric slab 308.

The side walls of the wave guide 300 are interrupted to expose the recessed or notched portions inside the shielding members 303 and 304, as shown, to accommodate windings 311 and 312. These windings are provided with ferrite cores 313 and 314, respectively. The core 313 is in contact with the slabs 301 and 302 to complete a closed magnetic circuit through core 313, slab 301, slab 305, slab 302 back to core 313. The core 314 completes a closed magnetic circuit through core 314, slab 301′, slab 306, slab 302′ back to core 314.

Slab 305 is preferably shorter than slab 306 and slab 305 together with slab 309 present square ends that are flush and form a wave reflective surface for waves coming from the remote end of wave guide 300 and entering the space between the shielding member 303 and the septum 310. Slab 306 has square ends and is the same length as the shielding member 304. Slab 307 is preferably tapered at one end to fit a complementary taper of slab 309 and at the other end to extend into the otherwise empty portion of the wave guide 300 along with a similar tapered portion of slab 308. The slab 308 is tapered at its other end and extends into the otherwise empty region of the remote portion of wave guide 300.

The operation of the arrangement shown in FIG. 11 is similar to that of the arrangement shown in FIG. 2.

Structurally and functionally the slab 23 in FIG. 2 corresponds to the slab 305 of FIG. 11, the terminating member 24 corresponds to terminating member 309, septum 21 corresponds to septum 310, and slab 22 corresponds to slab 306. The dielectric slabs 307 and 308 serve to increase the effective dielectric constant over that of the air spaces in the arrangement of FIG. 2, thereby increasing the effective widths of the laterally restricted portions of the wave guide. They also serve as fillers or spacers so that assembly is facilitated, and by being tapered at the ends they reduce wave reflection. The notched wave guide structure of FIG. 11 permits the windings 311 and 312 to be included partially within the limits of the main wave guide.

The ferrite surfaces which define the restricted portions of the wave guide and which would otherwise be permeable to the electromagnetic waves should be copper plated or otherwise covered by a conductive coating or conductive plate member. In the arrangement of FIG. 10, the conductively covered surfaces should include all faces of the ferrite slabs 201, 202, and 205 except where the core 205 contacts the slabs 201 and 202. In these latter contact areas it is preferable that the conductive coatings be omitted in order that there shall be a minimum of magnetic gaps between the magnetic members 201, 202, and 205.

In the arrangement of FIG. 11, the septum 310 divides the main wave guide into two parallel compartments. All surfaces of the ferrite slabs 301, 301′, 302, and 302′ should be conductively covered except where the core 313 contacts the slabs 301 and 302 and where the core 314 contacts the slabs 301′ and 302′.

No extremely critical adjustments of dimensions, tuning, strength of magnetizing field, etc., are required in structures in accordance with the invention. The longitudinal dimensions of the structure have negligible effect n the insertion loss in the open state and on the power sorption in the closed state. With respect to the magni-es of the impedance mismatches at the air-ferrite junc-, the over-all length of the structure and the geo-cal configurations of the two ends are important. ver, by introducing and adjusting simple tuning in known manner close tolerances on the dimen-d placement of the switch component parts may ed. The mismatches of the typical untuned re sufficiently small (VSWR in the range 1.02 losses in the tuning screws themselves or due to internal resonances in the structure are not serious. The tuning is of course frequency sensitive.

We find in a typical case that for a given ferrite composition and a given operating frequency, the insertion loss of a notched or restricted guide section begins at a few decibels for $H_{DC}$ equal to zero, falls rapidly to a few tenths of a decibel at $H_{DC}$ equal to less than five oersteds, and remains in that range up to $H_{DC}$ equal to about 20 oersteds. Beyond that range the device goes abruptly into cut-off, reaching an insertion loss of about 50 decibels at $H_{DC}$ equal to about 40 oersteds and remaining there over a wide range of values of $H_{DC}$. At much higher field values the effect of ferromagnetic resonance is evidenced in that, while the insertion loss remains high, the device becomes lossy with consequent deterioration of the input deflection coefficient. The above figures indicate that by proper selection of magnetizing field intensities the behavior of the switch can be made uncritical with respect to small changes in magnetizing current supply during operation. That is, elaborate regulation of the magnetizing current supply source is not required.

It is to be understood that the above-described arrangements are illustrative of the application of the principles of the invention. Numerous other arrangements may be devised by those skilled in the art without departing from the spirit and scope of the invention.

What is claimed is:

1. In combination, a conductively bounded transmission path for electromagnetic wave energy within a given range of operating frequencies, said path having first and second successive longitudinal portions each characterized by one transverse dimension which determines the cutoff frequency of wave energy supported therein, said transverse dimension in said first portion determining a cutoff frequency for said first portion which is below the lowest frequency in said operating range, means including a physical restriction of said transverse dimension in said second portion for producing a cutoff frequency for said second portion which is above the highest frequency in said operating range, means including relatively high dielectric constant material for lowering the cutoff frequency of said portion below the lowest frequency within said range, said last recited means being disposed within said second portion and extending along the entire longitudinal extent thereof, said material comprising magnetically controllable material which exhibits gyromagnetic properties within said frequency range, and means for selectively raising the cutoff frequency of said second portion above the highest frequency within said operating range to inhibit propagation of said energy through said second portion, said last recited means comprising magnetic structure means for impressing a magnetic biasing field upon said material and control means for switching the intensity of said biasing field between zero and a strength for which said gyromagnetic material presents to said wave energy a permeability equal to or less than zero.

2. In combination, a transmission path having a rectangular transverse cross section for electromagnetic wave energy within a given range of operating frequencies, said transmission path having a first longitudinal portion in which the maximum transverse dimension is physically greater than one-half guide wavelength at the lowest frequency within said frequency range and a second longitudinal portion in which said transverse dimension is physically restricted to be less than one-half guide wavelength at the highest frequency within said frequency range, means including relatively high dielectric constant gyromagnetic material for increasing the electrical size of said transverse dimension in said second longitudinal portion to a value greater than one-half guide wavelength at the lowest operating frequency, said means being disposed within said second portion along the entire longitudinal extent thereof, and means for selectively reducing the electrical size of said transverse dimension in said second portion to a value less than one-half guide wavelength at the highest operating frequency in the presence of said element to inhibit propagation of said energy through said second portion, said last recited means comprising magnetic structure means for impressing a transverse biasing field upon said element and control means for switching the intensity of said biasing field between zero and a value for which said element presents to said wave energy a permeability equal to or less than zero.

3. In combination, a conductively bounded transmission path for electromagnetic wave energy within a given range of operating frequencies, said path having first and second successive longitudinal portions each characterized by at least one transverse dimension which determines the cutoff frequency of wave energy supported therein, said transverse dimension in said first portion determining a cutoff frequency for said first portion which is below the lowest frequency in said operating range, means including a physical restriction of said transverse dimension in said second portion for producing a cutoff frequency for said second portion which is above the highest frequency in said operating range, means including gyromagnetic material disposed within said second longitudinal portion for lowering the cutoff frequency of said path to another value which is above the highest frequency in said range, and means for selectively lowering the cutoff frequency of said second portion below the lowest frequency within said operating range to permit propagation of said energy through said second portion, said last recited means comprising magnetic structure means for impressing a transverse magnetic biasing field upon said material and control means for switching the intensity of said biasing field between zero and a strength for which said gyromagnetic material presents to said wave energy a permeability substantially greater than unity.

4. In combination, a transmission path having a rectangular transverse cross section for electromagnetic wave energy within a given range of operating frequencies, said transmission path having a first longitudinal portion in which the maximum transverse dimension is physically greater than one-half guide wavelength at the lowest frequency within said frequency range and a second longitudinal portion in which said transverse dimension is physically restricted to be less than one-half guide wavelength at the highest frequency within said frequency range, means including gyromagnetic material disposed within said second longitudinal portion for increasing the electrical size of said transverse dimension in said second portion to another value which is less than one-half guide wavelength at the highest frequency within said frequency range, and means for selectively increasing the electrical size of said transverse dimension in said second portion to a value greater than one-half guide wavelength at the lowest operating frequency in the presence of said element to permit propagation of said energy through said second portion, said last recited means comprising magnetic structure means for impressing a transverse biasing field upon said material and control means for switching the intensity of said biasing field between zero and a strength for which said element presents to said wave energy a permeability substantially greater than unity.

References Cited in the file of this patent

UNITED STATES PATENTS

| | | |
|---|---|---|
| 2,197,123 | King | Apr. 16, 1940 |
| 2,402,948 | Carlson | July 2, 1946 |
| 2,576,186 | Malter et al. | Nov. 27, 1951 |
| 2,607,031 | Dennis et al. | Aug. 12, 1952 |
| 2,629,079 | Miller | Feb. 17, 1953 |
| 2,679,631 | Korman | May 25, 1954 |
| 2,693,583 | Rigrod | Nov. 2, 1954 |
| 2,719,274 | Luhrs | Sept. 27, 1955 |
| 2,745,069 | Hewitt | May 8, 1956 |
| 2,773,245 | Goldstein | Dec. 4, 1956 |
| 2,776,412 | Sparling | Jan. 1, 1957 |
| 2,784,378 | Yager | Mar. 5, 1957 |
| 2,788,494 | Vogeley | Apr. 9, 1957 |
| 2,798,205 | Hogan | July 2, 1957 |
| 2,802,183 | Read | Aug. 6, 1957 |
| 2,830,289 | Zaleski | Apr. 8, 1958 |
| 2,850,705 | Chait et al. | Sept. 2, 1958 |
| 2,870,418 | Hewitt | Jan. 20, 1959 |

FOREIGN PATENTS

| | | |
|---|---|---|
| 674,874 | Great Britain | July 2, 1952 |

OTHER REFERENCES

Kales et al.: "A Nonreciprocal Microwave Component," Journal of Applied Physics, vol. 24, No. 6, June 1953, pages 816–17.

Darrow: Bell System Technical Journal, vol. 32, Nos. 1 and 2, January and March 1953, pages 74–99 and 384–405.

Jonker et al.: Physics XVI, No. 3, March 1950, pages 337–349.

Hogan: "Reviews of Modern Physics," January 1953, pages 253–263.

"Modern Advances in Microwave Techniques," published July 1955, pages 221–224.